(12) United States Patent
Hsueh et al.

(10) Patent No.: US 8,700,903 B2
(45) Date of Patent: Apr. 15, 2014

(54) STREAMLINED CSR GENERATION, CERTIFICATE ENROLLMENT, AND CERTIFICATE DELIVERY

(75) Inventors: Steve Hsueh, Palo Alto, CA (US); Zhengwen Ju, Fremont, CA (US); Yutong Wang, San Jose, CA (US); John Yun, Fremont, CA (US)

(73) Assignee: Symantec Corporation, Mountain View, CA (US)

( * ) Notice: Subject to any disclaimer, the term of this patent is extended or adjusted under 35 U.S.C. 154(b) by 154 days.

(21) Appl. No.: 13/190,861

(22) Filed: Jul. 26, 2011

(65) Prior Publication Data
US 2012/0030469 A1  Feb. 2, 2012

Related U.S. Application Data

(60) Provisional application No. 61/368,511, filed on Jul. 28, 2010.

(51) Int. Cl.
*H04L 9/32* (2006.01)
*H04L 29/06* (2006.01)
*G06F 15/16* (2006.01)
*G06F 17/30* (2006.01)
*G06F 7/00* (2006.01)

(52) U.S. Cl.
USPC ............ 713/175; 713/156; 709/206; 707/769

(58) Field of Classification Search
USPC ......... 713/155–159, 168–176, 182–186, 202; 709/225, 229; 726/2–8
See application file for complete search history.

(56) References Cited

U.S. PATENT DOCUMENTS

2011/0055249 A1*  3/2011  Consuegra et al. ........... 707/769
2011/0296172 A1*  12/2011  Fu et al. ....................... 713/156

* cited by examiner

*Primary Examiner* — Evans Desrosiers
(74) *Attorney, Agent, or Firm* — Patterson & Sheridan LLP (57) ABSTRACT

The process of acquiring SSL certificates for enterprise SSL customers is improved by reducing the number of steps used to acquire the SSL certificate and streamlining the process. An on-line CSR generator on the certificate enrollment form is used to submit the customer information (i.e. Common Name, Organizational Unit, Organization, City/Locality, State/Province, and Country Code) and generate the CSR. By making the CSR generation part of the enrollment process, the administrator can use the same enrollment form to submit the customer information along with the contact information pertinent to the enterprise.

12 Claims, 5 Drawing Sheets

STREAMLINED CSR GENERATION, CERTIFICATE ENROLLMENT, AND CERTIFICATE DELIVERY

CROSS-REFERENCE TO RELATED APPLICATIONS

This application claims the benefit of, and priority to, U.S. Provisional Application No. 61/368,511, filed Jul. 28, 2010, the disclosure of which is incorporated by reference in its entirety.

BACKGROUND

The present invention is related to digital certificates, and more particularly to provisioning and deployment of digital certificates.

In recent years e-commerce has become an important way of conducting business. However, there are still concerns among many internet users regarding how secure transaction conducted over the internet really are. One concern that users have is whether the website conducting business is a legitimate website. If a user conducts business on a website that is not legitimate, the user could easily end up being a victim of fraud, monetary theft, identity theft etc. In order for e-commerce to remain a viable alternative to traditional ways of conducting business, online transactions and connections need to be secure.

Digital certificates are used to help ensure the security of online transactions by providing a means for authenticating the identity of websites. Since websites having a digital certificate have been authenticated by a third party certification authority (CA), such as VeriSign®, a subscriber using the website with a digital certificate has some comfort in knowing that the website has undergone some vetting process. X.509 certificates, also referred to as digital certificates, are used to authenticate websites.

Digital (X.509) certificates are defined by the Telecommunication Standardization Sector (ITU-T) of the International Telecommunication Union (ITU) as part of the Directory (X.500) series. Currently, digital certificates are issued to a subscriber after the subscriber requests the certificate, pays for the certificate and undergoes an authentication and verification process.

The issued digital certificates, as described by RFC 5280 (http://www.ietf.org/rfc/rfc5280.txt), contains the date at which the certificate becomes valid, and a later date at which the certificate expires. For example, a subscriber requesting an SSL certificate, from a CA, will pay the full amount up front and receive a digital certificate whose validity start date is set to the date on which the digital certificate was issued. The validity end date will typically be one, two, or three years after the validity start date.

Figure 1:
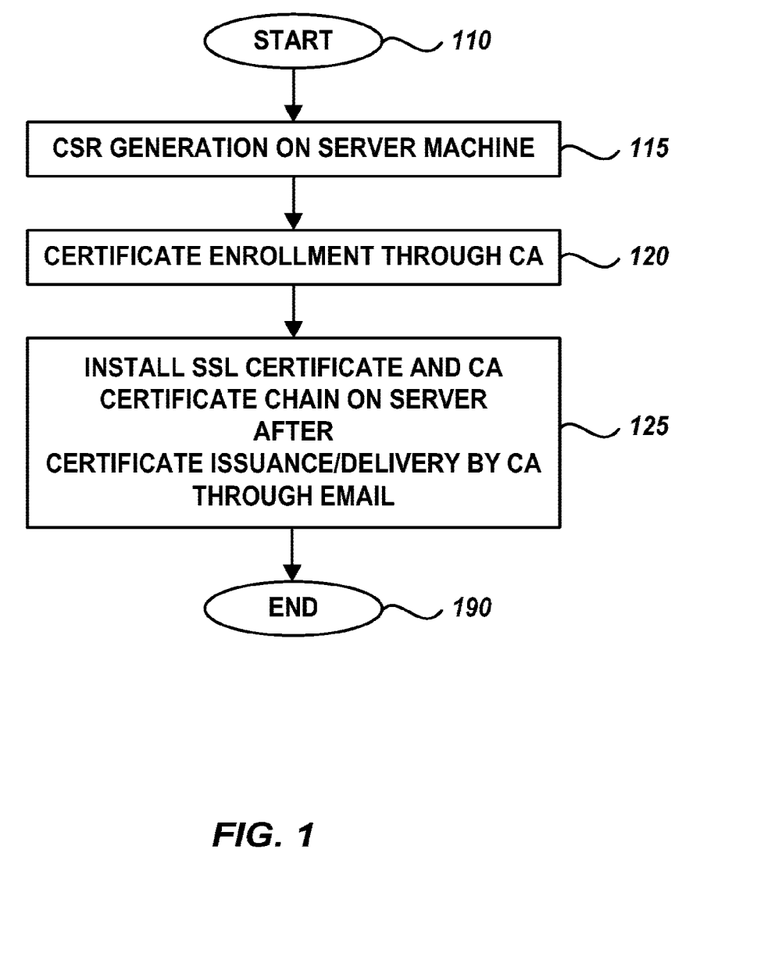
FIG. 1 is a flowchart illustrating the current three-step process used by an enterprise SSL customer to acquire an SSL certificate.

One form of a digital certificate is a Secure Sockets Layer (SSL) certificate. SSL certificates are usually acquired by performing a three-step process, as illustrated in FIG. 1. FIG. 1 is a flowchart illustrating the current three-step method used by an enterprise SSL customer to acquire an SSL certificate. The method starts in step 110 where the system is initialized. In step 115, the Certificate Signing Request (CSR) is generated. The current CSR generation step uses a system administrator or webmaster to generate a PKCS10 Certificate Signing Request (CSR) on the server machine (for which the SSL certificate is requested). An open source implementation of the SSL protocol (openssl) or a web server administration console is used for the CSR generation. In step 120 the certificate is enrolled. The current certificate enrollment step uses an administrator to enroll an SSL certificate through a CA-supplied enrollment form. The administrator enters the customer contact information and copies and pastes the CSR blob on the enrollment form. Next in step 125, the certificate is issued, delivered and installed. The current certificate issuance/delivery step uses the CA to issue a certificate, which is delivered to the administrator through an email. The administrator then installs the issued SSL certificate onto the web server along with its intermediate CA certificate chain. In step 190, the method ends when the SSL certificate is installed.

This three-step process of obtaining an SSL certificate can be time consuming and can require that the customer perform several steps, which is inefficient and takes up the customer time. Therefore, a system and method is needed that streamlines the process used by enterprise SSL customers by reducing the number of steps used to acquire the SSL certificate.

BRIEF SUMMARY

Embodiments of the invention improve the process of acquiring SSL certificates for enterprise SSL customers by reducing the number of steps used to acquire the SSL certificate and streamlining the process. In embodiments, the three-step process previously used is consolidated into a one-step process that makes it is easier for an enterprise customer to acquire an SSL certificate.

Embodiments of the invention make the CSR generation step a part of the on-line certificate enrollment step. Instead of using openssl or other third-party tools to generate CSRs, an enterprise administrator uses an on-line CSR generator on the certificate enrollment form to submit the customer information (i.e. Common Name, Organizational Unit, Organization, City/Locality, State/Province, and Country Code) and generate the CSR. By making the CSR generation part of the enrollment process, the administrator can use the same enrollment form to submit the customer information along with the contact information pertinent to the enterprise. For example, after the enrollment form is submitted and while the administrator waits for a response, a public/private key pair may be generated by the on-line CSR generator and encrypted using an administrator-supplied password. The encrypted private key is kept in the transient memory, which is a temporary memory, of the client machine from which the certificate enrollment information including the CSR is submitted. As another example, a public/private key pair may be created during the enrollment submission and/or process. The private key also may be encrypted with a user-supplied password. Since enterprise customers and administrators are pre-vetted, an SSL certificate may be issued instantly, and may be installed automatically.

Embodiments of the invention may provide techniques for acquiring digital certificates that include receiving an enrollment form with an online CSR generator and capturing on the certificate enrollment form customer information provided by an administrator to generate the digital certificate. A private key may be generated by the on-line CSR generator, and encrypted using an administrator-supplied password. The encrypted private key may be stored in a transient memory, such as a memory of the client machine from which the certificate enrollment information including the CSR is submitted. Information to decrypt the encrypted private key may be sent, and the private key decrypted and stored, such as in the transient memory. It then may be determined whether a domain name provided by the administrator has been authenticated and/or whether the administrator's identity has been authenticated. Upon determining that the domain name and the administrator's identity are authentic, the digital certificate may be issued. The digital certificate may be delivered, such as to the results page of the enrollment form, after which the digital certificate may be installed.

In an embodiment, an enrollment form may be received an online CSR generator, and customer information provided by an administrator to generate the digital certificate may be captured, such as on a certificate enrollment form. A private key may be generated using the online CSR generator. The private key may be encrypted, such as using an administrator-supplied password. The encrypted private key may be stored, such as in a transient memory of the client machine from which the certificate enrollment information including the CSR is submitted. Information to decrypt the encrypted private key may be provided.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION

A further understanding of the nature and advantages of the invention may be realized by reference to the remaining portions of the specification and the drawings, presented below. The Figures are incorporated into the detailed description portion of the invention.

DETAILED DESCRIPTION

Embodiments of the invention improve the process of acquiring SSL certificates for enterprise SSL customers by reducing the number of steps used to acquire the SSL certificate and streamlining the process. Existing methods used by enterprise SSL customers to acquire SSL certificates use a three-step process which includes CSR generation, certificate enrollment, and certificate installation after certificate issuance/delivery, which is inefficient. In embodiments of the invention, this three-step process is consolidated into a one-step process that makes it is easier for an enterprise customer to acquire an SSL certificate.

Embodiments of the invention make the CSR generation step part of the on-line certificate enrollment step. Instead of using openssl or other third-party tools to generate CSRs, an enterprise administrator uses an on-line CSR generator on the certificate enrollment form to submit the customer information (i.e. Common Name, Organizational Unit, Organization, City/Locality, State/Province, and Country Code) and generate the CSR. By making the CSR generation part of the enrollment process, the administrator can use the same enrollment form to submit the customer information along with the contact information pertinent to the enterprise. After the enrollment form is submitted and while the administrator waits for a response, the private key is generated by the on-line CSR generator and encrypted using an administrator-supplied password. The encrypted private key is kept in the transient memory, which is a temporary memory, of the client machine from which the certificate enrollment information including the CSR is submitted. Since enterprise customers and administrators are pre-vetted, an SSL certificate is immediately issued. In some configurations, the certificate also may be installed automatically. As another example, the CSR generator may already have created a public/private key pair before the enrollment form is submitted. In such a configuration, the preexisting private key may be encrypted with the administrator-supplied password. It then may later be combined with an issued certificate, such as to generate a PKCS12 or similar file that can be installed by a certificate requestor.

According to other embodiments of the invention, enterprise SSL customers, organizations, and domains are pre-vetted by the CA. The certificate requestor's contact information is delegated to a customer administrator, who is also pre-vetted by the CA. Since the customer administrator is pre-vetted by the CA, so is the certificate requestor. Therefore, both the enterprise SSL customer and the certificate requestor are pre-vetted by the CA. If a pre-vetted administrator or requestor, acting on behalf of an enterprise customer, enrolls for an SSL certificate for which the organization and the fully qualified domain name in the CSR matches one of the pre-vetted organizations and one of the pre-vetted domains in the customer's account, respectively, the corresponding SSL certificate can be issued instantly by the CA.

According to other embodiments, immediately after the certificate is issued the certificate can be delivered to the results page of the enrollment form. The results page of the enrollment form can be formatted in either PKCS12, which includes the certificate itself and the password-encrypted private key, or in separate PEM (base 64-encoded) X.509 or PKCS7 certificate blob and PEM (base64- encoded password-encrypted) private key blob. PKCS12 can be transmitted (through a secure channel) and readily and directly installed onto a Microsoft IIS server. PEM formatted X.509 or PKCS7 certificate and PEM formatted private keys can be transmitted (through a secure channel) and installed onto an Apache or iPlanet server.

Embodiments of the invention provide several improvements over previously used methods. First, the on-line CSR generation on the certificate enrollment form makes CSR generation mush easier. Second, the instant issuance of SSL certificates (with pre-vetted organization and pre-vetted domain in the CSR) requested by a pre-vetted administrator speeds up the process of obtaining SSL certificates. Third, the automatic certificate delivery to the results page of the certificate enrollment form, formatted in PKCS12 or PEM, makes the certificate installation process automatic and/or easier for the administrator or requestor. The invention consolidates and streamlines the entire certificate acquisition process.

Figure 2:
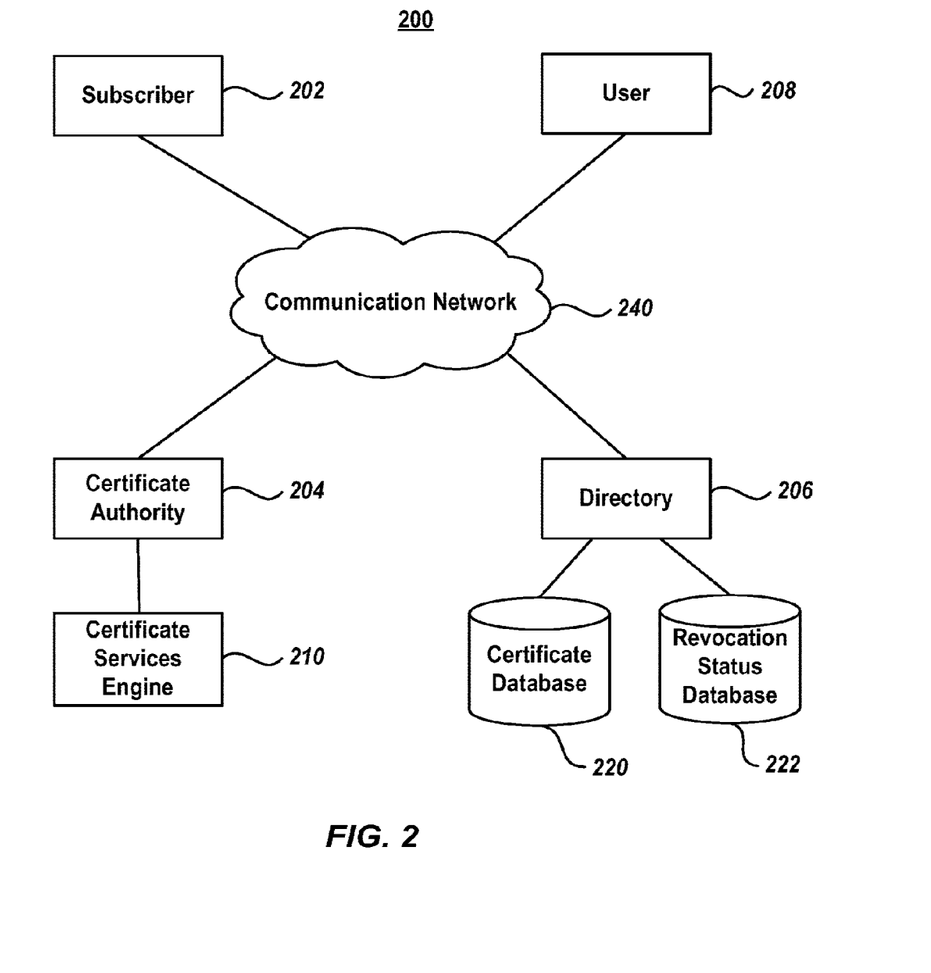
FIG. 2 is a block diagram showing a network including a certificate authority, according to an embodiment of the present invention.

FIG. 2 is a block diagram of a system 200 suitable for use with the present invention. The system 200 includes a subscriber 202, a Certificate Authority (CA) 204, a directory 206, and a user 208, all of which are coupled to a communications network 240. The system 200 further includes a certificate services engine 210, a digital certificate database 220, a certificate revocation list (CRL) 222, and a user database 230. The certificate services engine 210 is coupled to CA 204. The digital certificate database 220 and CRL 222 are coupled to the directory 206. The user database 230 is coupled to user 208.

The labels "subscriber", "CA", "directory", and "user" are given to describe the role which each of these entities plays with respect to digital certificates used in a public-key infrastructure (PKI). In a PKI, security is achieved by using public-key cryptography, and entities such as subscriber 202 are associated with a key pair which includes a public key and a private key. Subscriber 202 holds his private key securely and makes his public key widely available by means of a digital certificate issued by CA 204.

As used in this description, "digital certificate" means a document which associates the subscriber 202 with his public key and is digitally signed by the CA 204, using the CA's private key. A digital certificate is "digitally signed" by a CA 204 if a third party can verify that the CA 204 has signed the document and can also verify that the contents of the document have not changed since the CA 204 has signed. Preferably, this is achieved by one-way hashing the document and then encrypting the one-way hash using the CA's 204 private key to produce a digital signature included as part of the digital certificate. CA 204 uses certificate services engine 210 to issue digital certificates, as well as to possibly supply other digital certificate services.

Directory 206 is designed to facilitate efficient access to digital certificates. Once CA 204 has issued a digital certificate to subscriber 202, the digital certificate may be easily accessed from a number of places, including directory 206. In system 200, directory 206 is coupled to a digital certificate database 220 and to a CRL 222. Digital certificate database 220 is a database of digital certificates, including subscriber 202's digital certificate. CRL 222 is a database of digital certificates which have been revoked.

User 208 is an entity which uses subscriber's 202 digital certificates, typically to authenticate that an unknown party is the specific subscriber 202 who he claims to be. For example, an unknown party might approach user 208 over communications network 240, claiming to be a specific subscriber 202. As proof of this, the unknown party might supply his digital certificate to user 208. User 208 verifies that the contents of the digital certificate have not been tampered with. Then, if user 208 trusts the CA 204 of the digital certificate, user 208 can also trust that the subscriber 202 named in the digital certificate is bound to the public key contained in the certificate. Hence, if the unknown party communicates using the corresponding private key, then user 208 can further trust that the unknown party is the subscriber 202 named in the digital certificate. If user 208 does not trust CA 204, user 208 will request CA 204's digital certificate in order to authenticate the identity of CA 204. User will repeat this process traversing up a chain of digital certificates until it reaches a CA 204 which it trusts, at which point, user 208 will have authenticated that the unknown party is subscriber 202. This method of authenticating is also known as a chain of trust.

In a different variation, the unknown party might not supply its digital certificate. Instead, the party may supply information about himself and user 208 might then retrieve the appropriate digital certificate from directory 206. Directory 206 retrieves the digital certificate from digital certificate database 220 and also checks CRL 222 to insure that the digital certificate has not been revoked. User 208 then authenticates the identity of the unknown party, using the same procedure as described above.

Once user 208 has authenticated the identity of subscriber 202 using subscriber's 202 digital certificates, the certificate becomes a "trusted" digital certificate and user 208 may store the trusted digital certificate in user database 230. Then, when subscriber 202 subsequently contacts user 208, the entire authentication process need not be repeated. Instead, user 208 may simply access user database 230 for subscriber's 202 trusted digital certificates, provided that the digital certificate has not been revoked or otherwise compromised during the interim. User database 230 may also include any other information about subscriber 202 which user 208 finds useful.

In FIG. 2, subscriber 202, CA 204, directory 206, and user 208 are shown as separate entities. In fact, a single entity may play more than one role. For example, a certification authority may play the role of both CA 204 and directory 206. Alternately, the user 208 may also function as a directory 206 for digital certificates of subscribers 202 who frequent the user 208, as described previously. Entities may also take on different roles in different contexts. For example, an intermediate digital certificate authority will be a subscriber 202 with respect to the entity which issues the intermediate digital certificate authority's digital certificate but will be a CA 204 with respect to digital certificates which it issues. In addition, subscriber 202, CA 204, directory 206, and user 208 have been referred to as entities because they, in fact, may be individuals, computer servers, corporations, organizations, e-mail locations, or any other entity which may be involved in the digital certificate structure. These entities, however, will typically communicate with the communications network 240 via a computer.

In an embodiment which will be used to illustrate various aspects of the invention, communications network 240 is the Internet. User 208 is an individual accessing the Internet via a commercial browser, such as Microsoft's Internet Explorer. Subscriber 202 is a merchant with an on-line storefront, typically implemented by e-commerce software running on a server. CA 204 and directory 206 are implemented on servers by commercial vendors of digital certificate services, such as VeriSign. It should be noted that the invention may be used with systems other than those using the architecture of FIG. 2. For example, the entities 202, 204, 206, and 208 may communicate with each other over separate communications networks or dedicated communications channels, rather than through the common communications network 240 of FIG. 2. Alternately, various parts of system 200 may be implemented by mobile components and may not be permanently attached to a communications network. For example, subscriber 202 may interact with the other entities via a smart card, which may contain subscriber 202's digital certificate.

The CA 204 can include a processor that can be a general purpose microprocessor configured to execute instructions and data, such as a Pentium, Xeon, Core or Atom processor manufactured by the Intel Corporation of Santa Clara, Calif. It can also be an Application Specific Integrated Circuit (ASIC) that embodies at least part of the instructions for performing the method in accordance with the present invention in software, firmware and/or hardware. As an example, such processors include dedicated circuitry, ASICs, combinatorial logic, other programmable processors, combinations thereof, and the like. The databases 220 and 222 are memory devices that can be local or distributed as appropriate to the particular application. The databases can store information related to the certificates previously issued by the CA, program code and instructions executed by a processor, and other suitable data. For example, the databases can store historical records for each certificate issued by the CA including long-lived certificate information collected, as described in further detail with reference to FIGS. 4 and 5. The memory in the databases can include a number of memories including a main random access memory (RAM) for storage of instructions and data during program execution and a read only memory (ROM) in which fixed instructions are stored. Thus, memory in the databases provides persistent (non-volatile) storage for program and data files, and may include a hard disk drive, flash memory, a floppy disk drive along with associated removable media, a Compact Disk Read Only Memory (CD-ROM) drive, an optical drive, removable media cartridges, and other like storage media.

Figure 3:
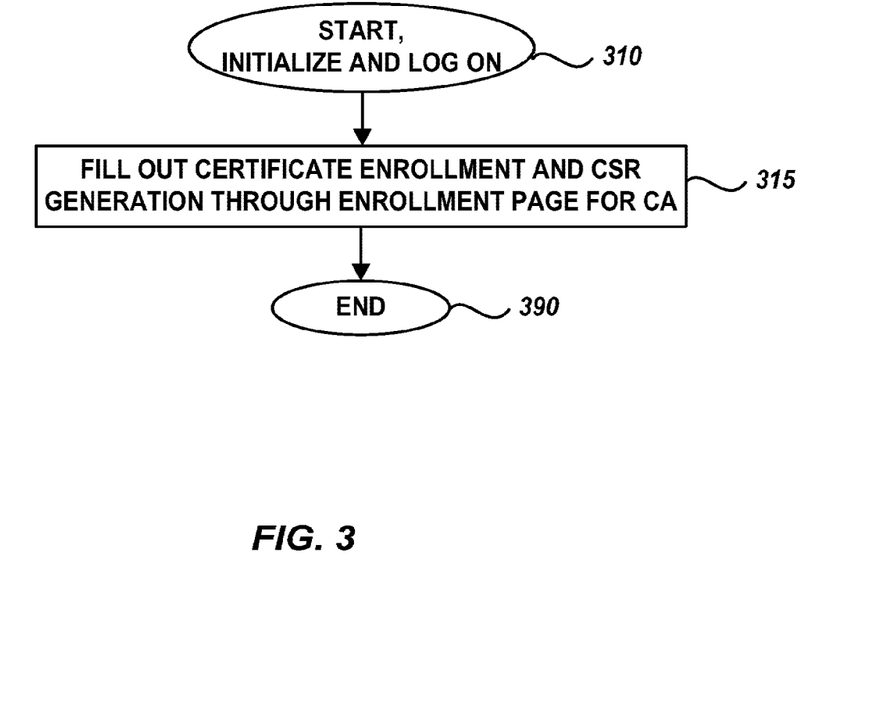
FIG. 3 is a flowchart illustrating a streamlined one-step process used by enterprise SSL customers to acquire SSL certificates, in accordance with an embodiment of the invention.

FIG. 3 is a flowchart illustrating a streamlined one-step process used by enterprise SSL customers to acquire SSL certificates, in accordance with an embodiment of the invention. The flowchart illustrated in FIG. 3 can be implemented in the system described above with reference to FIG. 2. The one-step process reduces the number of steps the requestor must perform from three to one. Specifically, the one-step process only requires the requestor to fill out the enrollment form. After the requestor fills out the enrollment form, the steps of CSR generation, certificate enrollment, and certificate installation after certificate issuance/delivery by a certification authority (CA) are performed automatically without manual intervention. As illustrated in FIG. 3, the method starts in operation 310 where the requestor, which can be an enterprise SSL customer, logs onto the CA server and prepares for requesting an SSL certificate. In operation 310, the user logs on to the user server by entering appropriate identification information such as usernames and passwords. Next in operation 315, the requester fills out the certificate enrollment form and CSR generation through the enrollment page for the CA. In operation 390, the method ends when the SSL certificate is delivered to the results page and installed. In operation 390, the user can confirm that the SSL certificate has been delivered and installed and can also log off the CA server, if desired or if business has been completed.

Figure 4:
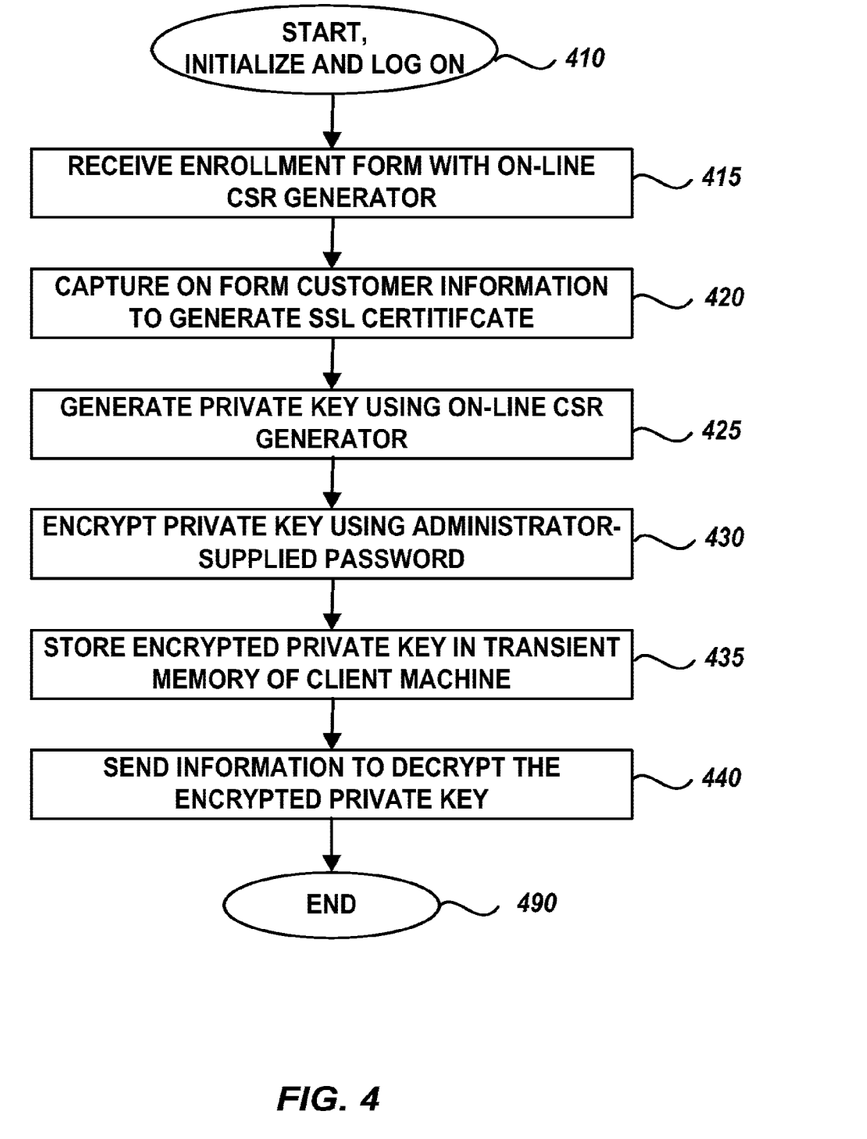
FIG. 4 is a flowchart illustrating operations performed to issued a certificate when the streamlined one-step process illustrated in FIG. 3 is used by enterprise SSL customers to acquire SSL certificates, in accordance with an embodiment of the invention.

FIG. 4 is a flowchart illustrating operations performed to issue a certificate when the streamlined one-step process illustrated in FIG. 3 is used by enterprise SSL customers to acquire SSL certificates, in accordance with an embodiment of the invention. The flowchart illustrated in FIG. 4 can be implemented in the system described above with reference to FIG. 2. The method starts in operation 410 where the system is initialized so that an enterprise SSL customer, can log onto a CA server and request an SSL certificate. Next in operation 415, an enrollment form with an online CSR generator is provided. In operation 420, customer information provided by an administrator to generate the SSL certificate is captured on the certificate enrollment form. Next in operation 425, a private key is generated using the on-line CSR generator. In operation 430, the private key is encrypted using an administrator-supplied password. Next in operation 435, the encrypted private key is stored in a transient memory of the client machine from which the certificate enrollment information including the CSR is submitted. The transient memory is also a temporary memory. In operation 440, information to decrypt the encrypted private key is sent. In operation 490, the method ends. In some embodiments, the methods ends after the SSL certificate is delivered to the results page and installed.

Figure 5:
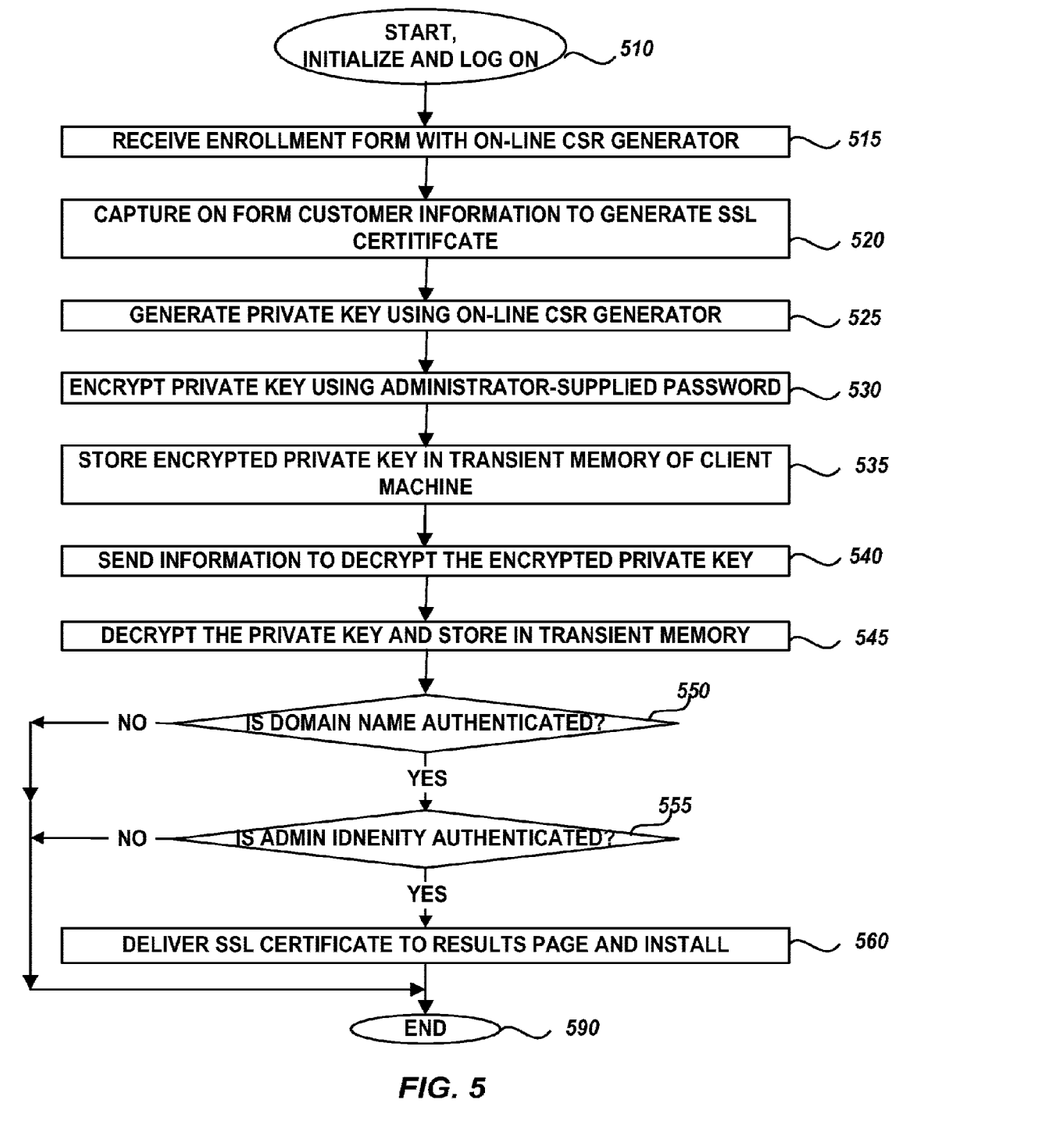
FIG. 5 is a flowchart illustrating operations performed to issued a certificate when the streamlined one-step process illustrated in FIG. 3 is used by enterprise SSL customers to acquire SSL certificates, in accordance with another embodiment of the invention.

FIG. 5 is a flowchart illustrating operations performed to issue a certificate when the streamlined one-step process illustrated in FIG. 3 is used by enterprise SSL customers to acquire SSL certificates, in accordance with another embodiment of the invention. The flowchart illustrated in FIG. 5 can be implemented in the system described above with reference to FIG. 2. The method starts in operation 510 where the system is initialized so that an enterprise SSL customer, can log onto a CA server and request an SSL certificate. Next in operation 515, an enrollment form with an online CSR generator is provided. In operation 520, customer information provided by an administrator to generate the SSL certificate is captured on the certificate enrollment form. Next in operation 525, a private key is generated using the on-line CSR generator. In operation 530, the private key is encrypted using an administrator-supplied password. Next in operation 535, the encrypted private key is stored in a transient memory of the client machine from which the certificate enrollment information including the CSR is submitted. The transient memory is also a temporary memory. In operation 540, information to decrypt the encrypted private key is sent. Next in operation 545, the private key is decrypted and stored in the transient memory. In operation 550, a decision is made whether a domain name provided by the administrator has been authenticated. If the decision made in operation 550 is that the domain name provided by the administrator has not been authenticated, the method ends in operation 590. If the decision made in operation 550 is that the domain name provided by the administrator has been authenticated, the method continues to operation 555. In operation 555, another decision is made whether the administrator's identity has been authenticated. If the decision made in operation 555 is that the administrator's identity has not been authenticated, the method ends in operation 590. If the decision made in operation 555 is that the administrator's identity has been authenticated, the method continues to operation 560. In operation 560, the SSL certificate is issued after the determining that the domain name and the administrator's identity are authentic. In operation 565 the SSL certificate is delivered to the results page of the enrollment form and installed. In operation 590, the method ends after the SSL certificate is delivered to the results page and installed.

According to one embodiment, a method for acquiring digital certificates, includes receiving an enrollment form with an online CSR generator, capturing on the certificate enrollment form customer information provided by an administrator to generate the digital certificate, generating a private key using the on-line CSR generator, encrypting the private key using an administrator-supplied password, storing the encrypted private key in a transient memory of the client machine from which the certificate enrollment information including the CSR is submitted, and sending information to decrypt the encrypted private key. The transient memory can be a temporary memory. The digital certificate can be an SSL certificate. The digital certificate can be formatted in PKCS12 and can include the digital certificate and the password-encrypted private key.

In yet other embodiments, the method includes decrypting the private key and storing the private key in the transient memory.

In yet other embodiments, the method includes determining whether a domain name provided by the administrator has been authenticated.

In yet other embodiments, the method includes determining whether the administrator's identity has been authenticated, upon determining that the domain name and the administrator's identity are authentic, issuing the digital certificate, delivering the digital certificate to the results page of the enrollment form, and installing the digital certificate.

In yet other embodiments, the method further includes selecting the digital certificate type from the group including premium, standard, and extended validation.

According to another embodiment, a method for acquiring digital certificates, includes receiving an enrollment form with an online CSR generator, capturing on the certificate enrollment form customer information provided by an administrator to generate the digital certificate, generating a private key using the on-line CSR generator, encrypting the private key using an administrator-supplied password, storing the encrypted private key in a transient memory of the client machine from which the certificate enrollment information including the CSR is submitted, sending information to decrypt the encrypted private key, decrypting the private key and storing the private key in the transient memory, determining whether a domain name provided by the administrator has been authenticated, determining whether the administrator's identity has been authenticated, upon determining that the domain name and the administrator's identity are authentic, issuing the digital certificate, delivering the digital certificate to the results page of the enrollment form, and installing the digital certificate. The transient memory can be a temporary memory. The digital certificate can be an SSL certificate. In some embodiments, the domain name can be pre-vetted and/or the administrator's identity can be pre-vetted.

In other embodiments, the method can further include selecting the digital certificate type from the group including premium, standard, and extended validation.

In yet other embodiments, the digital certificate can be formatted in PKCS12 and can include the digital certificate and the password-encrypted private key. Installing the digital certificate can further include transmitting the digital certificate through a secure channel, and installing the digital certificate on a Microsoft IIS server.

In yet other embodiments, the digital certificate can be formatted in separate PEM (base64-encoded) X.509. Installing the digital certificate can further include transmitting the digital certificate through a secure channel, and installing the digital certificate on an Apache or iPlanet server.

In yet other embodiments, the digital certificate can be formatted in PKCS7 certificate blob and PEM (base64-encoded password-encrypted) private key blob. Installing the digital certificate can further include transmitting the digital certificate through a secure channel, and installing the digital certificate on an Apache or iPlanet server.

In yet other embodiments, capturing on the certificate enrollment form customer information includes capturing a common name, an organization unit, an organization name, and a location.

Although specific embodiments of the invention have been described, various modifications, alterations, alternative constructions, and equivalents are also encompassed within the scope of the invention. The described invention is not restricted to operation within certain specific data processing environments, but is free to operate within a plurality of data processing environments. Additionally, although the present invention has been described using a particular series of transactions and steps, it should be apparent to those skilled in the art that the scope of the present invention is not limited to the described series of transactions and steps.

Further, while the present invention has been described using a particular combination of hardware and software, it should be recognized that other combinations of hardware and software are also within the scope of the present invention. The present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope of the invention as set forth in the claim.

What is claimed is:

1. A method for acquiring digital certificates from a certificate authority (CA), comprising:
   receiving an enrollment form with an online CSR generator;
   capturing on the certificate enrollment form customer information provided by an administrator to generate the digital certificate;
   generating a private key using the on-line CSR generator;
   encrypting the private key using an administrator-supplied password;
   storing the encrypted private key in a transient memory of the client machine from which the certificate enrollment information including the CSR is submitted;
   sending information to decrypt the encrypted private key;
   decrypting the private key and storing the private key in the transient memory;
   determining whether a domain name provided by the administrator has previously been authenticated by the CA as being administrated by the administrator;
   determining, in response to receiving the enrollment form, whether the administrator's identity has been authenticated;
   upon determining that the domain name and the administrator's identity are authentic, issuing the digital certificate;
   delivering, in response to receiving the enrollment form, the digital certificate to the results page of the enrollment form, wherein the digital certificate is delivered through a secure channel; and installing the digital certificate.

2. The method of claim 1 wherein the digital certificate is an SSL certificate.

3. The method of claim 1 further comprises selecting the digital certificate type from the group comprising of premium, standard, and extended validation.

4. The method of claim 1 wherein the digital certificate is formatted in PKCS12 and includes the digital certificate and the password-encrypted private key.

5. The method of claim 4 wherein installing the digital certificate further comprises:
   installing the digital certificate on a Microsoft IIS server.

6. The method of claim 1 wherein the digital certificate is formatted in separate PEM (based64-encoded) X.509.

7. The method of claim 6 wherein installing the digital certificate further comprises:
   installing the digital certificate on an Apache or iPlanet server.

8. The method of claim 1 wherein the digital certificate is formatted in PKCS7 certificate blob and PEM (base64-encoded password-encrypted) private key blob.

9. The method of claim 8 wherein installing the digital certificate further comprises: and
   installing the digital certificate on an Apache or iPlanet server.

10. The method of claim 1 wherein the domain name has been pre-vetted.

11. The method of claim 1 wherein the administrator's identity has been pre-vetted.

12. The method of claim 1 wherein capturing on the certificate enrollment form customer information comprises capturing:
    a common name;
    an organization unit;
    an organization name; and
    a location.

* * * * *

UNITED STATES PATENT AND TRADEMARK OFFICE
CERTIFICATE OF CORRECTION

PATENT NO. : 8,700,903 B2  Page 1 of 1
APPLICATION NO. : 13/190861
DATED : April 15, 2014
INVENTOR(S) : Hsueh et al.

It is certified that error appears in the above-identified patent and that said Letters Patent is hereby corrected as shown below:

In the Claims:

Column 10, Claim 9, Line 52, please delete "and".

Signed and Sealed this
Twenty-ninth Day of July, 2014

Michelle K. Lee
*Deputy Director of the United States Patent and Trademark Office*